US012127520B2

(12) United States Patent
Luo et al.

(10) Patent No.: US 12,127,520 B2
(45) Date of Patent: Oct. 29, 2024

(54) FAN LAMP

(71) Applicant: Sinowell (Shanghai) Co., Ltd., Shanghai (CN)

(72) Inventors: Jia Luo, Shanghai (CN); Yunfei Duan, Shanghai (CN); Liang Zhou, Shanghai (CN)

(73) Assignee: SINOWELL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/907,004

(22) PCT Filed: Jun. 28, 2022

(86) PCT No.: PCT/CN2022/101793
§ 371 (c)(1),
(2) Date: Sep. 22, 2022

(87) PCT Pub. No.: WO2023/206776
PCT Pub. Date: Nov. 2, 2023

(65) Prior Publication Data
US 2024/0196812 A1  Jun. 20, 2024

(30) Foreign Application Priority Data

Apr. 29, 2022 (CN) .......................... 202221032581.3
Apr. 29, 2022 (CN) .......................... 202221033902.1

(51) Int. Cl.
*A01G 9/24* (2006.01)
*F04D 25/16* (2006.01)
(Continued)

(52) U.S. Cl.
CPC ............... *A01G 9/246* (2013.01); *A01G 9/24* (2013.01); *A01G 9/249* (2019.05); *F04D 25/166* (2013.01); *F04D 29/646* (2013.01); *F21V 21/008* (2013.01); *F21V 29/60* (2015.01); *F21V 29/67* (2015.01); *F21V 33/0096* (2013.01); *Y02A 40/25* (2018.01)

(58) Field of Classification Search
CPC .......... A01G 9/246; A01G 9/24; A01G 9/249; F04D 25/166; F04D 29/646; F21V 21/008; F21V 29/60; F21V 29/67; F21V 33/0096; Y02A 40/25
See application file for complete search history.

(56) References Cited

U.S. PATENT DOCUMENTS

2019/0113219 A1\* 4/2019 Niemiec ................. A01M 1/08

FOREIGN PATENT DOCUMENTS

| CN | 211861191 | 11/2020 |
|---|---|---|
| CN | 212544736 | 2/2021 |

(Continued)

OTHER PUBLICATIONS

International Search Report dated Nov. 23, 2022 from corresponding PCT Application No. PCT /CN2022/101793.

*Primary Examiner* — Audrey B. Walter
(74) *Attorney, Agent, or Firm* — ArentFox Schiff LLP

(57) ABSTRACT

A fan lamp includes a lamp mount and a plurality of fan assemblies disposed on the lamp mount. The fan lamp have functions of lighting and ventilation, moreover, the coverage area of the lighting and ventilation is large, not only can the growth of plants be promoted, but also the characteristics of simple structure and small occupation space can have.

19 Claims, 5 Drawing Sheets

(51) Int. Cl.
*F04D 29/64* (2006.01)
*F21V 21/00* (2006.01)
*F21V 21/008* (2006.01)
*F21V 29/60* (2015.01)
*F21V 29/67* (2015.01)
*F21V 33/00* (2006.01)

(56) References Cited

FOREIGN PATENT DOCUMENTS

| CN | 212544736 | U | * | 2/2021 | ............. | Y02A 40/25 |
|---|---|---|---|---|---|---|
| CN | 212544771 | | | 2/2021 | | |
| CN | 212544771 | U | * | 2/2021 | ............. | Y02A 40/25 |
| CN | 113412750 | | | 9/2021 | | |
| CN | 214535904 | | | 10/2021 | | |

* cited by examiner

FAN LAMP

CROSS-REFERENCE TO RELATED APPLICATION(S)

This is a national stage application filed under 35 U.S.C. 371 based on International Patent Application No. PCT/CN2022/101793, filed Jun. 28, 2022, which claims priority to Chinese Patent Application No. 202221032581.3 filed with the China National Intellectual Property Administration (CNIPA) on Apr. 29, 2022 and claims priority to Chinese Patent Application No. 202221033902.1 filed with the CNIPA on Apr. 29, 2022, the disclosures of which are incorporated herein by reference in their entireties.

TECHNICAL FIELD

The present application relates to the technical field of lamps, for example, a fan lamp.

BACKGROUND

The use of lamps to supplement lighting for indoor plants in tents and planting fields can promote the growth of plants. For a lamp used in a special scenario such as a tent or a planting field, not only the functions of easy splicing and disassembly, but also the characteristics of simple structure and small occupation space are required.

However, tents and planting fields suffer from poor ventilation, and this can lead to slow growth of plants. To solve this problem, in the related art, fans are often additionally arranged in tents and planting fields to promote air circulation. Due to the limited space in the tents and the planting fields, this arrangement of lamps and fans leads to complex installation and a large occupation space.

SUMMARY

The present application provides a fan lamp having functions of lighting and ventilation.

A fan lamp includes a lamp mount and a plurality of fan assemblies disposed on the lamp mount.

REFERENCE LIST

Figure 1:
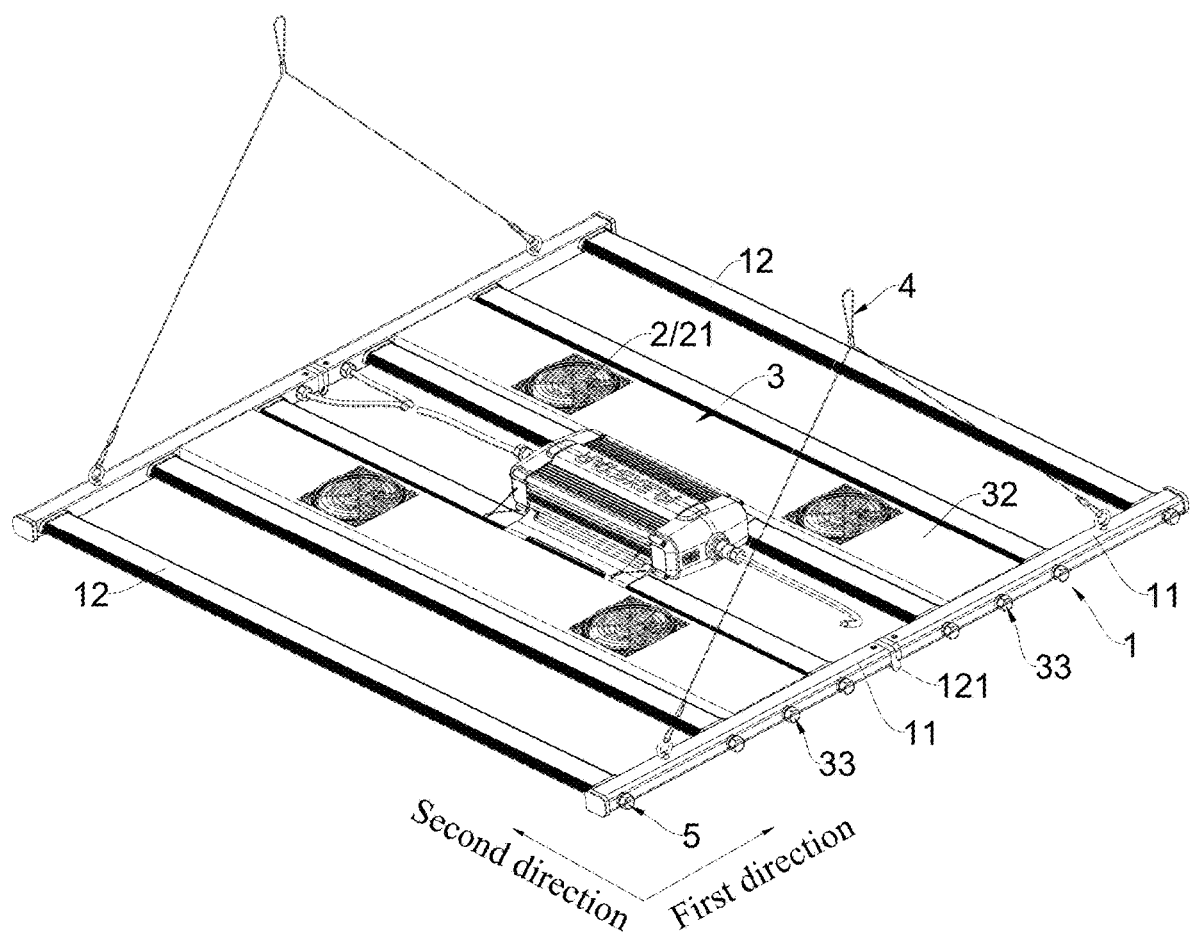
FIG. 1 is a view illustrating the structure of a fan lamp according to an embodiment of the present application.

1 lamp mount
11 mount body
12 lamp body
121 hinge
122 plate-type connection piece
123 corner connection piece
13 power supply box
131 hanging ring
14 power supply box mount
2 fan assembly
21 fan
22 fan mount
221 fan frame
222 connection bracket
2221 threaded hole
2222 snap
223 fan connector
2231 positioning hole
2232 connection hole
224 reinforcing rib
3 blowing unit
32 mounting member
33 blowing adjustment assembly
4 lifting member
41 hanging rope
42 rope securing member
5 lighting adjustment assembly

DETAILED DESCRIPTION

Technical solutions in the embodiments of the present application will be described in conjunction with drawings in the embodiments of the present application. The embodiments described herein are part of the embodiments of the present application. Generally, the components of this embodiment of the present application described and illustrated in the drawings herein may be arranged and designed through various configurations.

Therefore, the following description of the embodiments of the present application and shown in the drawings merely illustrates the selected embodiments of the present application.

Similar reference numerals and letters indicate similar items in the following drawings, and therefore, once an item is defined in one drawing, the item needs no definition and explanation in subsequent drawings.

In the description of the present application, the orientational or positional relationships indicated by terms "above", "below", "left", "right", "vertical", "horizontal", "inside", "outside" and the like are based on the orientational or positional relationships illustrated in the drawings or the orientational or positional relationship that products of the present application are usually used in. These orientations or position relations are intended only to facilitate and simplify description of the present application, and not to indicate or imply that a device or element referred to must have such specific orientations or must be configured or operated in such specific orientations. Thus, these orientations or position relations are not to be construed as limiting the present application. Moreover, terms "first", "second" and "third" are merely for distinguishing the description and are not to be construed as indicating or implying relative importance. In the description of the present application, unless otherwise noted, the term "a plurality of" or "multiple" means two or more.

In the description of the present application, unless otherwise specified and limited, the term "configured" or "connected" is to be construed in a broad sense, for example, as securely connected, detachably connected or internally connected; or mechanically connected or electrically connected. For those of ordinary skill in the art, meanings of the preceding terms can be understood according to situations in the present application.

In the present application, unless otherwise specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

Embodiments of the present application are described below, and examples of the embodiments are illustrated in the drawings, where the same or similar reference numerals indicate the same or similar elements or elements having the same or similar functions. The embodiments described below with reference to the drawings are illustrative and only for explaining the present application.

Figure 2:
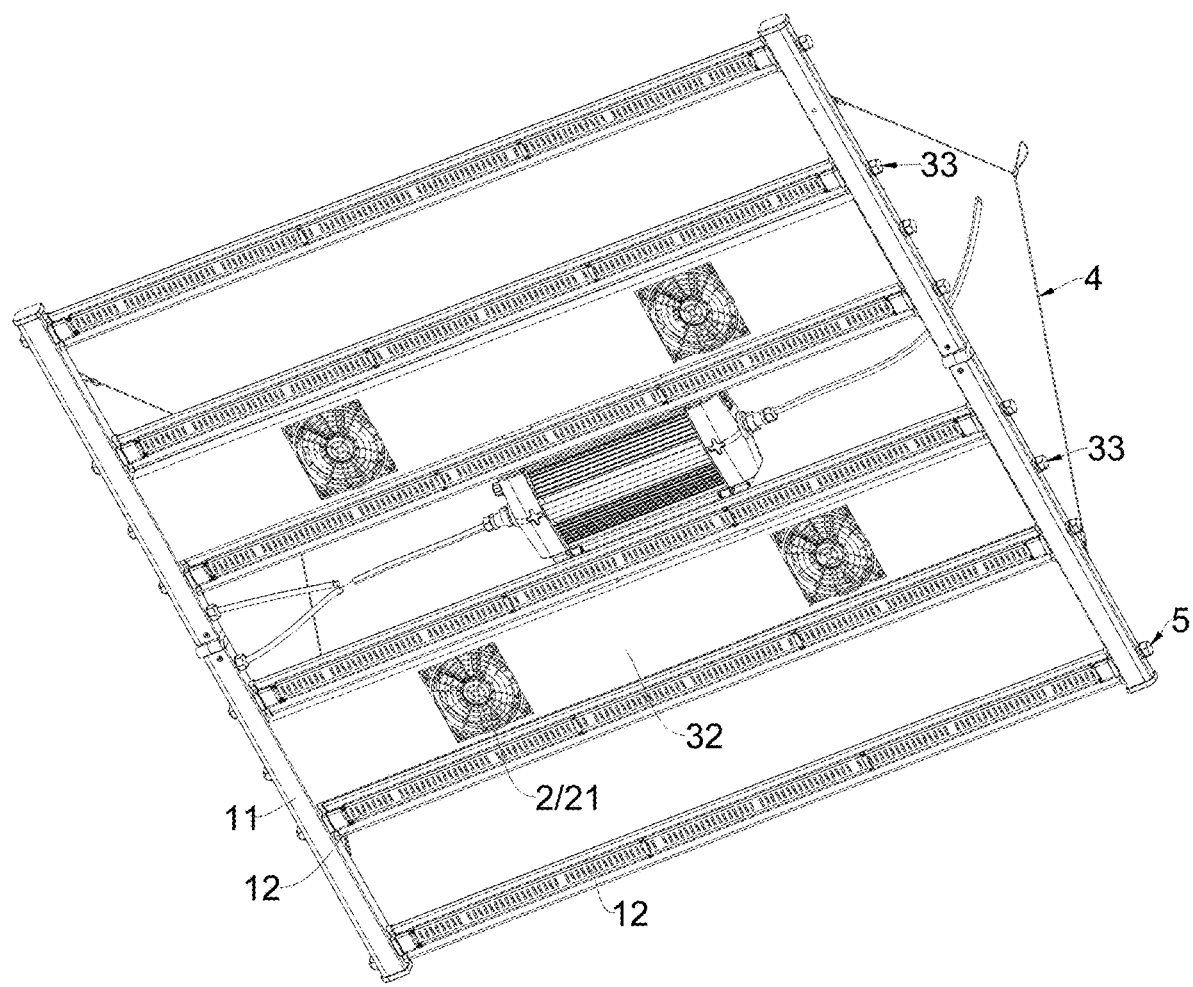
FIG. 2 is a view illustrating the structure of another fan lamp according to an embodiment of the present application.
Figure 3:
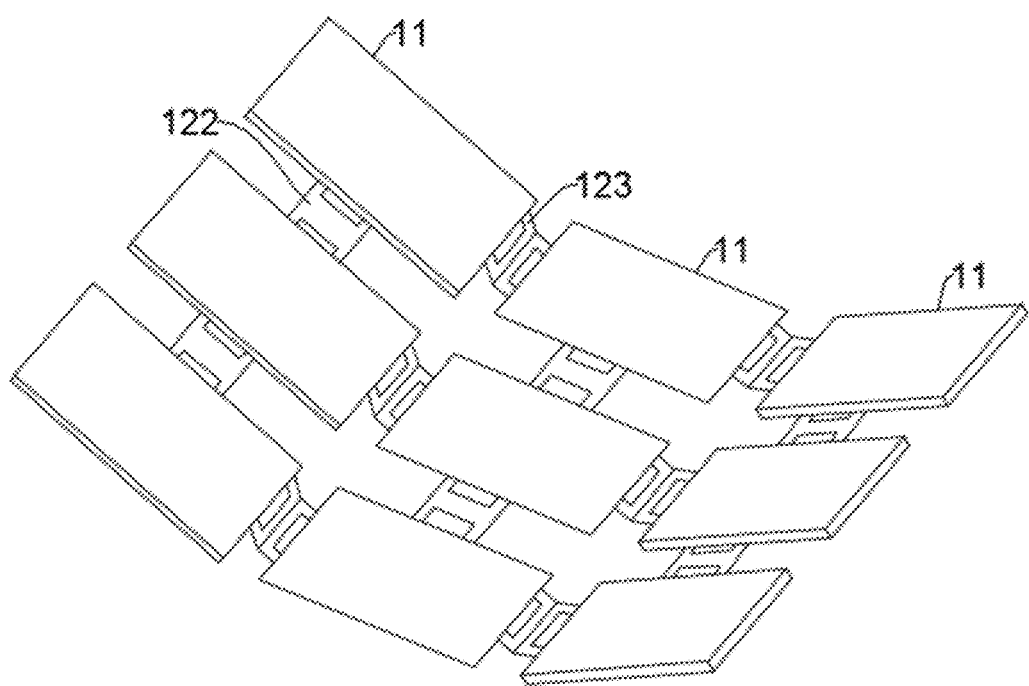
FIG. 3 is a view illustrating the structure of another fan lamp according to an embodiment of the present application.

As shown in FIGS. 1 to 3, this embodiment provides a fan lamp. The fan lamp includes a lamp mount 1 and multiple fan assemblies 2 disposed on the lamp mount 1.

Optionally, the fan lamp also includes lamp bodies 12 and blowing units 3. The lamp mount 1 includes multiple mount bodies 11. Two adjacent mount bodies 11 are connected by a connector such that the two adjacent mount bodies 11 are located on the same plane or such that an included angle is formed between the two adjacent mount bodies. The fan assemblies 2 are fans 21. At least one lamp body 12 is disposed on each mount body 11. At least one blowing unit 3 is disposed on each mount body 11. Each blowing unit 3 includes a mounting assembly and multiple fans 21. The multiple fans 21 are mounted on the mount body 11 corresponding to the each blowing unit 3 by the mounting assembly.

The lamp mount 1 includes multiple mount bodies 11 connected to each other. At least one lamp body 12 and at least one blowing unit 3 are disposed on each mount body 11, having functions of lighting and ventilation. Moreover, the coverage area of the lighting and ventilation is large.

Thus, not only can the growth of plants be promoted, but also the characteristics of simple structure and small occupation space can have.

Optionally, the mounting assembly includes a mounting member 32 and a blowing adjustment assembly 33. The multiple fans 21 are securely disposed on the mounting member 32. The mounting member 32 is rotatably connected to the mount body 11 corresponding to the each blowing unit 3. The blowing adjustment assembly 33 can selectively lock the mounting member 32 to the lamp mount 1 or unlock the mounting member 32 from the lamp mount 1. After the mounting member 32 is rotated to an appropriate angle, the mounting member 32 and the lamp mount 1 are locked by the blowing adjustment assembly 33 so that blowing directions of fans 21 can be adjusted to meet various blowing requirements.

In this embodiment, the blowing adjustment assembly 33 includes two threaded rods securely connected to two ends of the mounting member 32 in a one-to-one manner. The two threaded rods pass through two sides of the lamp mount 1 in a one-to-one manner. The mounting member 32 is rotatably connected to the lamp mount 1 by the two threaded rods. Each threaded rod is sleeved with two nuts that are threaded to the each threaded rod. The two nuts can abut the two sides of the lamp mount 1 in a one-to-one manner to lock the mounting member 32 to the lamp mount 1. The angle of the mounting member 32 can be adjusted simply when the nuts are loosened. This structure is simple, and the operation is convenient.

Optionally, the lamp bodies 12 and the blowing units 3 are disposed alternately so that the light and the air circulation can be more uniform, improving the promoting effect on the growth of plants.

In this embodiment, blowing directions of blowing units 3 on two adjacent mount bodies 11 are parallel to each other so that the air in tents and planting fields can easily flow towards one direction, and the circulation is better.

In other embodiments, an included angle is formed between blowing directions of air blowing units 3 on two adjacent mount bodies 11 to facilitate blowing towards a specific direction or in a specific region. Blowing directions of air blowing units 3 on each mount body 11 can be disposed according to requirements, and this is more adaptable.

Optionally, the fan lamp also includes multiple blowing rate adjustment members. Each blowing rate adjustment member is electrically connected to all fans 21 on at least one mount body 11.

The blowing rate of the fans 21 electrically connected to the blowing rate adjustment members is adjusted by the blowing rate adjustment members, making it easier to accurately control the air circulation in tents and planting fields, thereby improving the promoting effect on the growth of plants. It is also possible to control the blowing rate of fans 21 on the multiple mount bodies 11 to be the same or different by the multiple blowing rate adjustment members to adapt to different requirements. Exemplarily, the blowing rate adjustment members are fan speed adjustment switches. The rotational speed of blades of the fans 21 corresponding to the fan speed adjustment switches is adjusted by the fan speed adjustment switches so that the blowing rate of the fans 21 can be adjusted. This is the related art and is not detailed herein.

Optionally, the fan lamp also includes multiple brightness adjustment members. Each brightness adjustment member is electrically connected to all lamp bodies 12 on at least one mount body 11. The brightness of the lamp bodies 12 electrically connected to the brightness adjustment members is adjusted by the brightness adjustment members, making it easier to accurately control the brightness of different regions in tents and planting fields, thereby improving the promoting effect on the growth of plants. It is also possible to control the brightness of lamp bodies 12 on the multiple mount bodies 11 to be the same or different by the multiple brightness adjustment members to adapt to different requirements. Exemplarily, the brightness adjustment members are dimmers. The lamp bodies 12 corresponding to the dimmers are controlled by the dimmers to emit light of different brightness. This is related art, and details are not described herein.

Optionally, the fan lamp also includes lifting members 4. A lifting member 4 includes a mounting end and multiple connection ends connected to the multiple mount bodies 11 in a one-to-one manner. In this manner, the installation stability of the fan lamp can be ensured, and accidental falling can be avoided.

Optionally, the lamp bodies 12 are rotatably disposed on the lamp mount 1. The fan lamp also includes lighting adjustment assemblies 5 disposed corresponding to the lamp bodies 12. The lighting adjustment assemblies 5 can selectively lock the lamp bodies 12 to the lamp mount 1 or unlock the lamp bodies 12 from the lamp mount 1. After the lamp bodies 12 are rotated to an appropriate angle, the lamp bodies 12 and the lamp mount 1 are locked by the lighting adjustment assemblies 5 so that the light outgoing directions of the lamp bodies 12 can be adjusted to meet various supplementary lighting requirements.

In this embodiment, threaded rods are securely connected to two ends of a lamp body 12. The threaded rods pass through the lamp mount 1. Each threaded rod is sleeved with two nuts that are threaded to the each threaded rod. The two nuts can abut two sides of the lamp mount 1 in a one-to-one manner to lock the lamp body 12 to the lamp mount 1. The angle of the lamp body 12 can be when the nuts are loosened.

In this embodiment, the multiple mount bodies 11 are connected end to end along a first direction.

Optionally, the multiple fans 21 are sequentially disposed on the mounting assembly along a second direction. The second direction is perpendicular to the first direction. In this manner, the coverage area of ventilation of the fan lamp is helped to expand, and the air circulation effect is helped to improve.

Optionally, as shown in FIG. 1 and FIG. 2, two adjacent mount bodies 11 are hinged by a connector. Ends of the two adjacent mount bodies 11 can abut each other such that the two adjacent mount bodies 11 are located on the same plane. Exemplarily, the connector is a hinge 121. The hinge 121 is located on one side of the mount bodies 11 so that the ends of the two adjacent mount bodies 11 can abut each other. Thus, the two mount bodies 11 are located on the same plane. The two mount bodies 11 can be folded to facilitate storage. In other embodiments, two adjacent mount bodies 11 may be hinged by a connector. Ends of the two adjacent mount bodies 11 can abut each other such that an included angle is formed between the two adjacent mount bodies 11. In this manner, the stability of the lamp mount 1 after installation can be satisfied, and the folding of two adjacent mount bodies 11 after disassembly is facilitated. This structure is simple, and the functionality is strong. The different forms of connectors enable blowing directions of fans 21 on two adjacent mount bodies 11 to be parallel or enable an included angle to be formed between two adjacent mount bodies 11.

In other embodiments, of two adjacent mount bodies 11, one is securely connected to one end of a connector, and another is securely connected to another end of the connector. In other words, the connector is a plate-type connection piece 122 so that the two adjacent mount bodies 11 are located on the same plane. Alternatively, the connector includes two connection portions between which an included angle is formed. The two connection portions are connected to two adjacent mount bodies 11 in a one-to-one manner. In other words, the connector is an corner connection piece 123. The corner connection piece 123 includes two plate-type connection pieces. The two plate-type connection pieces are connected to each other, and an included angle is formed between the two plate-type connection pieces so that an included angle is formed between the two adjacent mount bodies 11. Compared with the arrangement in this embodiment, the connection stability of multiple mount bodies 11 can be improved.

Exemplarily, the lamp mount 1 includes three rows of mount bodies 11 disposed side by side. Each row of mount bodies 11 include multiple mount bodies 11 connected end to end. Two adjacent mount bodies 11 in each row of mount bodies 11 are connected by a connector such as a plate-type connection piece 122 such that the two adjacent mount bodies 11 are located on the same plane. Two adjacent rows of mount bodies 11 are connected by connectors such as plate-type connection pieces 122 to form an integral lamp mount 1. All mount bodies 11 of the lamp mount 1 are located on the same plane. As shown in FIG. 3, two adjacent rows of mount bodies 11 may be connected by connectors such as corner connection pieces 123 to form an integral lamp mount 1. Thus, the light outgoing directions of the lamp bodies 12 and the blowing directions of the fans 21 on the two rows of mount bodies 11 on two sides are converged toward the row of mount bodies 11 in the middle to increase the light intensity and blowing rate. The multiple mount bodies 11 of the lamp mount 1 may be arranged in other forms, or may be arranged according to scenario requirements, and this is not limited herein.

In the related art, fans can only reduce the temperature of the environment located in the opposite direction of the fans, and the temperature in the place where the fans cannot blow is still very high. This causes that the temperature in the plant planting environment is not uniform, and the air circulation is poor, resulting in good growth of some plants, but poor growth of some plants.

Figure 4:
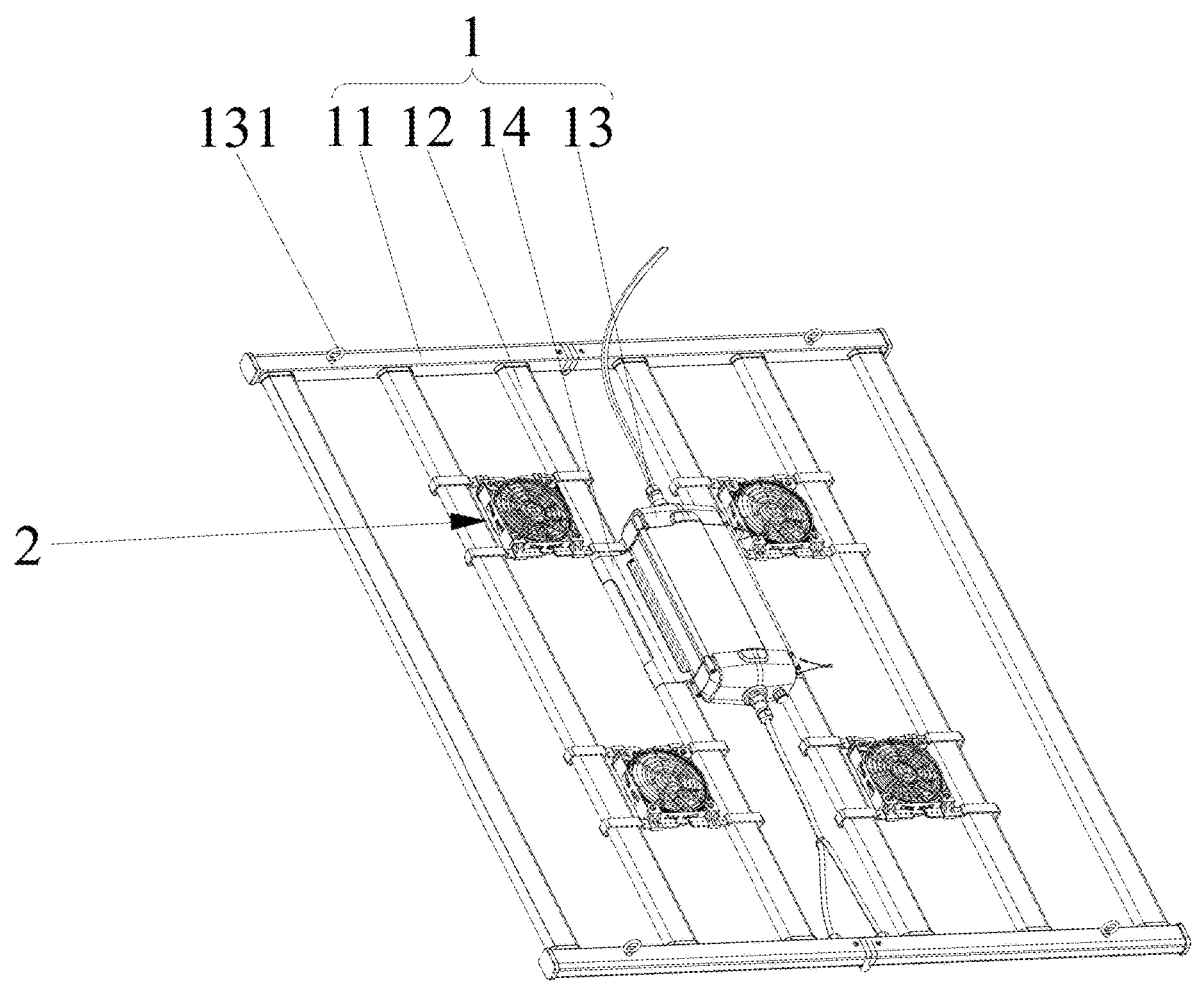
FIG. 4 is a view illustrating the structure of another fan lamp according to an embodiment of the present application.
Figure 5:
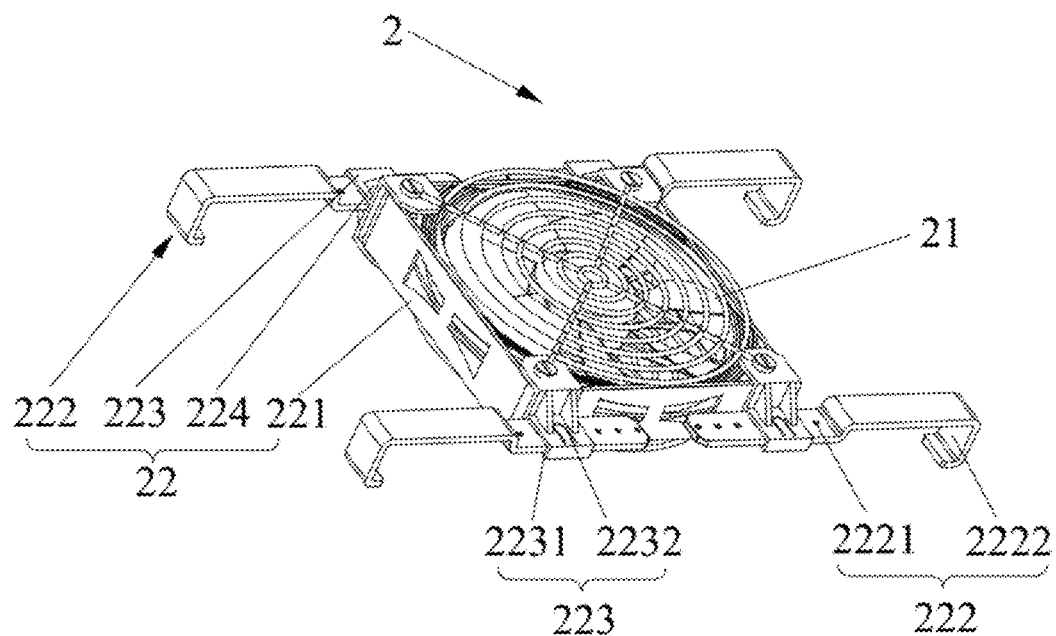
FIG. 5 is a view illustrating the structure of a fan assembly according to an embodiment of the present application.

As shown in FIG. 4 and FIG. 5, this embodiment provides a fan lamp. The fan lamp includes a lamp mount 1 and fan assemblies 2 disposed on the lamp mount 1. Multiple fan assemblies 2 are provided. The multiple fan assemblies 2 are uniformly distributed on the lamp mount 1. The fan assemblies 2 can be selectively mounted directly or inversely on the lamp mount 1 so that blowing directions of the fan assemblies 2 are downward or upward.

Multiple fan assemblies 2 are disposed on lamp mounts 1. The multiple fan assemblies 2 are uniformly distributed on the lamp mounts 1 to uniformly supply air to the plants in the planting environment, to enhance the air flow, and to supply the plants with the required gas. Therefore, the plants can better breathe with fresh air, the generation of molds on the plants is suppressed, and the plants grow healthily.

In the planting environment, generally, the air temperature in the upper layer is relatively high, and the air temperature in the lower layer is relatively low. A user can choose to mount the fan assemblies 2 directly to supply air downward or mount the fan assemblies 2 inversely to supply air upward according to the temperature in the planting environment and the optimum temperature for the growth of plants.

Exemplarily, the optimum temperature for the growth of plants is 25° C. In the planting environment, if the air temperature in the upper layer is 25° C. and the air temperature in the lower layer is 20° C., it is indicated that the air temperature in the upper layer is suitable for the growth of plants. The fan lamp is located above the plants so that the fan assemblies 2 are mounted directly to blow down the upper air suitable for the growth of plants.

In the planting environment, if the air temperature in the upper layer is 30° ° C. and the air temperature in the lower layer is 25° C., it is indicated that the air temperature in the lower layer is suitable for the growth of plants. Therefore, the fan assemblies 2 are mounted inversely to blow up the lower air suitable for the growth of plants.

If the temperature in the planting environment is not uniform, the air temperature in the lower layer on one side is suitable for the growth of plants, and the air temperature in the upper layer on another side is suitable for the growth of plants. In the fan lamp, it is possible to mount inversely the fan assemblies 2 located close to the lower layer on the one side where the air temperature is suitable for the growth of plants to blow up the lower air suitable for the growth of plants. In the fan lamp, it is possible to mount directly the fan assemblies 2 located close to the upper layer on the another side where the air temperature is suitable for the growth of plants to blow down the upper air suitable for the growth of plants.

The fan assemblies 2 can be selectively mounted directly or inversely on the lamp mount 1 so that the blowing directions are downward or upward. A user can select blowing directions according to the actual planting environment (temperature, humidity, and the like.) to make the temperature in the plant environment suitable and the growth state of plants better.

Optionally, the lamp mount 1 includes multiple lamp bodies 12 disposed in parallel and at intervals. The fan assemblies 2 are mounted between adjacent lamp bodies 12. In an embodiment, the lamp bodies 12 are fluorescent tubes.

In other embodiments, the lamp mount 1 may include an integral-type lamp plate. Multiple fan assemblies 2 are uniformly disposed on the lamp plate.

The lamp bodies 12 are light-emitting diode (LED) fluorescent tubes. The cross sections of the LED fluorescent tubes are square or round. The lamp mount 1 also includes a power supply box 13 and two mount bodies 11. Lamp bodies 12 are disposed on two sides of the power supply box 13. The lamp bodies 12 on the same side of the power supply box 13 are secured by one mount body 11. The two mount bodies 11 are rotatably connected so that the fan lamp can be folded. Thus, the fan lamp is convenient to use and small in transportation volume. The power supply box 13 engages with the lamp bodies 12 located on two sides of the power supply box 13 by a power supply box mount 14. One end of the power supply box 13 is provided with two wires. The two wires extend into the two mount bodies 11 in a one-to-one manner to electrically connect to the lamp bodies 12. Another end of the power supply box 13 is provided with one wire configured to be connected to an external power supply.

In this embodiment, each mount body 11 includes two securing rods. The two securing rods are securely connected to two ends of the lamp bodies 12 in a one-to-one manner. Three lamp bodies 12 and two fan assemblies 2 are disposed on each mount body 11. The three lamp bodies 12 are disposed in parallel and at intervals. On the two lamp bodies 12 close to the power supply box 13, one fan assembly 2 is disposed on the end close to the securing rod. In use, the four fan assemblies 2 may be mounted directly, or any two may be mounted directly, and the remaining two may be mounted inversely.

In other embodiments, the number of lamp bodies 12 and the number of fan assemblies 2 are not limited and may be set by those skilled in the art according to actual requirements.

Optionally, the fan assembly 2 includes a fan 21 and a fan mount 22. The fan 21 is mounted on the fan mount 22. The fan mount 22 is connected to two adjacent lamp bodies 12. The fan mount 22 includes a fan frame 221 and connection brackets 222. The fan 21 is disposed in the fan frame 221. The connection brackets 222 are disposed around the fan frame 221 and connected to the lamp bodies 12. The connection brackets 222 are connected to two adjacent lamp bodies 12. The fan 21 is disposed in the fan frame 221 to avoid the danger of blades of the fan 21 being exposed to the outside when the fan 21 rotates. The fan frame 221 is located between two adjacent lamp bodies 12 to prevent the lamp bodies 12 from shielding the blowing face of the fan 21, thereby affecting the blowing effect.

In other embodiments, the connection brackets 222 may not be disposed. The periphery of the fan frame 221 may be directly connected to the lamp bodies 12.

Optionally, fan connectors 223 are disposed around the fan frame 221. One end of the connection bracket 222 is connected to a fan connector 223. Another end of the connection bracket 222 is connected to a lamp body 12. The fan connector 223 includes a positioning hole 2231. The one end of the connection bracket 222 passes through the positioning hole 2231 to position the connection bracket 222 on the fan frame 221.

One fan connector 223 is disposed around each corner of the fan frame 221 separately. Each fan frame 221 is secured on the lamp mount 1 by four connection brackets 222. In this embodiment, the fan connector 223 is provided with a positioning hole 2231. The axis of the positioning hole 2231 is parallel to the fan frame 221. One end of the connection bracket 222 is inserted in the positioning hole 2231. The positioning hole 2231 is a round hole or a square hole. The one end of the connection bracket 222 connected to the positioning hole 2231 is adapted to the positioning hole 2231.

In this embodiment, the fan connector 223 is a connection block. The positioning hole 2231 is a square hole passing through the connection block. The connection bracket 222 is a connection plate. One end of the connection plate can be inserted into the square hole to support the fan frame 221. Another end of the connection plate is connected to the lamp body 12.

In other embodiments, the connection bracket 222 may be positioned by the cooperation of a positioning groove and a positioning block, or the like.

Optionally, the fan connector 223 also includes a first connection portion. The one end of the connection bracket 222 connected to the fan connector 223 is provided with a second connection portion. The first connection portion is cooperatively connected to the second connection portion. The first connection portion is configured as a connection hole 2232. The second connection portion is configured as a threaded hole 2221. A fastening bolt passes through the connection hole 2232 to threaded to the threaded hole 2221 to connect the connection bracket 222 to the fan frame 221.

In other embodiments, the connection bracket 222 may be connected to the fan connector 223 by engagement, welding, or the like.

Optionally, multiple second connection portions are disposed at intervals. The first connection portion can be selectively connected to one second connection portion. The connection bracket 222 is provided with multiple threaded holes 2221. The threaded hole 2221 at a suitable position can be selected according to the spacing between two adjacent lamp bodies 12 to cooperate with the connection hole 2232 on the fan connector 223. Then, the threaded hole 2221 and the connection hole 2232 are secured by a fastening bolt. It is possible to adapt the fan assembly 2 to lamp mounts 1 of different specifications by adjusting the spacing between connection brackets 222.

Optionally, a reinforcing rib 224 is disposed between the fan frame 221 and the fan connector 223. The arrangement of the reinforcing rib 224 can enhance the connection strength between the fan frame 221 and the fan connector 223 and ensure the reliability of the connection.

In this embodiment, two reinforcing ribs 224 are provided. The connection hole 2232 is disposed between the two reinforcing ribs 224.

Optionally, the end of the connection bracket 222 connected to the lamp body 12 is configured as a snap 2222. The connection bracket 222 engages with the lamp body 12 by the snap 2222. The cross section of the lamp body 12 is square or round. Correspondingly, the snap 2222 is configured as a square snap or a round snap. The connection bracket 222 engages with the lamp body 12 by the snap 2222, making it easy to mount and disassemble. Furthermore, the arrangement of the snap 2222 enables both the direct mounting of the fan assembly 2 and the inverse mounting of the fan assembly 2. The fan assembly 2 can be mounted directly or inversely on the lamp mount 1 according to actual requirements.

To adapt to the height difference between the fan frame 221 and the upper and lower surfaces of the lamp body 12, the end of the connection bracket 222 engaged with the lamp body 12 is set higher than the end of the connection bracket 222 connected to the fan connector 223.

Optionally, the blowing face of the fan 21 is provided with an air guide member (not shown). The air guide member is rotatably connected to the fan mount 22 to expand the blowing area of the fan 21. It is possible to rotatably connect the air guide member to the fan frame 221 and drive the air guide member to rotate by using a driving motor. With this configuration, the blowing direction can be adjusted, and the blowing area can be enlarged.

The air guide member is an air guide plate. The specific connection manner and operation principle of the air guide plate, the fan frame 221, and the driving motor are the related art and are not detailed herein.

Figure 6:
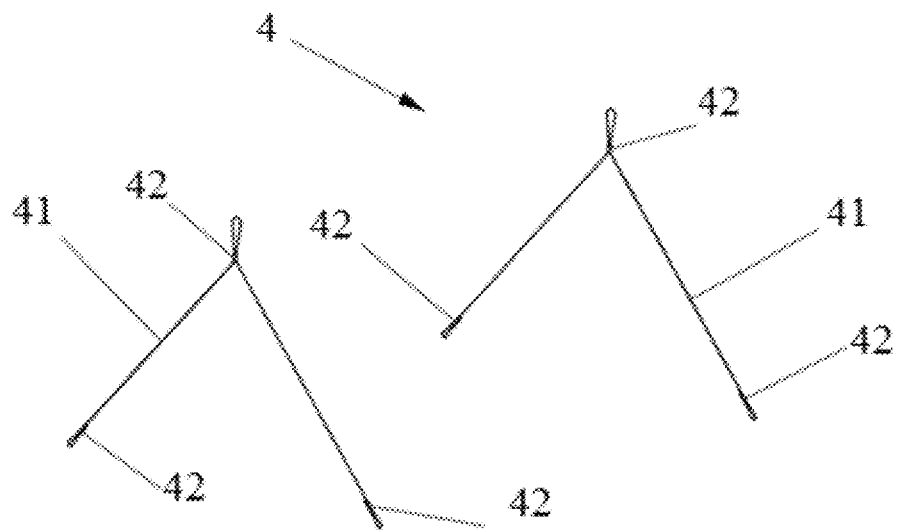
FIG. 6 is a view illustrating the structure of a lifting member of a fan lamp according to an embodiment of the present application.

As shown in FIG. 6, the fan lamp also includes lifting members 4. Each lifting member 4 includes a hanging rope 41 and rope securing members 42. Two hanging ropes 41 are provided. The two hanging ropes 41 are connected to the lamp mounts 11 at two ends of the lamp body 12 in a one-to-one manner. One hanging ring 131 is disposed on two securing rods of each lamp mount 11. Two rope securing members 42 are disposed at intervals at the end of each hanging rope 41 connected to the lamp mount 11. One rope securing member 42 is disposed at one end of each hanging rope 41 connected to a securing point in the plant environment. A hanging ring 131 is also disposed at the securing point in the plant environment. The hanging rope 41 passes through the hanging ring 131 and then cooperates with the rope securing member 42 to hang the fan lamp in the securing point in the plant environment.

What is claimed is:

1. A fan lamp, comprising:
   a lamp mount comprising a plurality of mount bodies, two adjacent mount bodies of the plurality of mount bodies are connected by a connector, an included angle is formed between the two adjacent mount bodies;
   a plurality of lamp bodies, wherein at least one lamp body of the plurality of lamp bodies is disposed on each of the plurality of mount bodies; and
   a plurality of blowing units, wherein at least one blowing unit of the plurality of blowing units is disposed on each of the plurality of mount bodies, each of the at least one blowing unit comprises a mounting assembly and a plurality of fan assemblies, each of the plurality of fan assemblies comprises a fan and the fan is mounted on a mount body of the plurality of mount bodies by the mounting assembly, and the mount body corresponds to a blowing unit of the plurality of blowing units.

2. The fan lamp according to claim 1, wherein the mounting assembly comprises a mounting member and a blowing adjustment assembly, the fan of each of the plurality of fan assemblies is securely disposed on the mounting member, the mounting member is rotatably connected to the mount body corresponding to each of the at least one blowing unit, and the blowing adjustment assembly is configured to selectively lock the mounting member to or unlock the mounting member from the lamp mount; and
   the blowing adjustment assembly comprises two threaded rods connected to two ends of the mounting member in a one-to-one manner, the two threaded rods pass through two sides of the lamp mount in a one-to-one manner, the mounting member is rotatably connected to the lamp mount by the two threaded rods, each of the two threaded rods is sleeved with two nuts that are threaded to each of the two threaded rods, and the two nuts are operable to abut the two sides of the lamp mount in a one-to-one manner to lock the mounting member to the lamp mount.

3. The fan lamp according to claim 1, wherein the plurality of lamp bodies and the plurality of blowing units are disposed alternately.

4. The fan lamp according to claim 1, wherein an included angle is formed between blowing directions of the plurality of blowing units on the two adjacent mount bodies.

5. The fan lamp according to claim 1, further comprising a plurality of blowing rate adjustment members, wherein each of the plurality of blowing rate adjustment members is electrically connected to all fans on at least one of the plurality of mount bodies, and the blowing rate adjustment members are fan speed adjustment switches.

6. The fan lamp according to claim 1, further comprising a plurality of brightness adjustment members, wherein each of the plurality of brightness adjustment members is electrically connected to all of the lamp bodies on at least one of the plurality of mount bodies, and the brightness adjustment members are dimmers.

7. The fan lamp according to claim 1, further comprising a lifting member, wherein the lifting member comprises a mounting end and a plurality of connection ends connected to the plurality of mount bodies in a one-to-one manner.

8. The fan lamp according to claim 1, wherein a lamp body of the plurality of lamp bodies is rotatably disposed on the lamp mount, the fan lamp further comprises a lighting adjustment assembly disposed corresponding to the lamp body, and the lighting adjustment assembly is configured to selectively lock the lamp body to the lamp mount or unlock the lamp body from the lamp mount; and
   the lighting adjustment assembly includes two threaded rods connected to two ends of the lamp body in a one-to-one manner, the two threaded rods pass through the lamp mount, each of the two threaded rods is sleeved with two nuts that are threaded to each of the two threaded rods, the two nuts are operable to abut two sides of the lamp mount in a one-to-one manner to lock the lamp body to the lamp mount.

9. The fan lamp according to claim 1, wherein the plurality of mount bodies are connected end to end along a first direction; and
   the two adjacent mount bodies are hinged by the connector, and ends of the two adjacent mount bodies are configured to abut each other such that the included angle is formed between the two adjacent mount bodies.

10. The fan lamp according to claim 9, wherein the fan of each of the plurality of fan assemblies is sequentially disposed on the mounting assembly along a second direction, wherein the second direction is perpendicular to the first direction.

11. The fan lamp according to claim 1, wherein the plurality of fan assemblies are uniformly distributed on the lamp mount, the plurality of fan assemblies are selectively mounted directly or inversely on the lamp mount such that blowing directions of the plurality of fan assemblies are downward or upward.

12. The fan lamp according to claim 11, wherein the plurality of lamp bodies are disposed in parallel and at intervals, and the plurality of fan assemblies are mounted between adjacent lamp bodies of the plurality of lamp bodies.

13. The fan lamp according to claim 12, wherein each of the plurality of lamp bodies is a fluorescent tube; and each of the plurality of fan assemblies further comprises a fan mount, the fan of each of the plurality of fan assemblies is mounted on the fan mount, and the fan mount is connected to two adjacent fluorescent tubes.

14. The fan lamp according to claim 13, wherein the fan mount comprises a fan frame and a connection bracket, the fan is disposed in the fan frame, and the connection bracket is disposed on a lateral side of the fan frame and connected to the fluorescent tube.

15. The fan lamp according to claim 14, wherein a fan connector is disposed on the lateral side of the fan frame, one end of the connection bracket is connected to the fan connector, and another end of the connection bracket is connected to the fluorescent tube;

the fan connector comprises a positioning hole, and the one end of the connection bracket passes through the positioning hole to position the connection bracket on the fan frame; and the fan connector further comprises a first connection portion, the one end of the connection bracket connected to the fan connector is provided with a second connection portion, and the first connection portion is cooperatively connected to the second connection portion.

16. The fan lamp according to claim 15, wherein a plurality of second connection portions are disposed at intervals, and the first connection portion is selectively connected to one of the plurality of second connection portions.

17. The fan lamp according to claim 15, wherein the first connection portion is configured as a connection hole, the second connection portion is configured as a threaded hole, and a fastening bolt passes through the connection hole and is threaded to the threaded hole to connect the connection bracket to the fan frame.

18. The fan lamp according to claim 15, wherein a reinforcing rib is disposed between the fan frame and the fan connector.

19. The fan lamp according to claim 15, wherein the another end of the connection bracket connected to the fluorescent tube is provided with a snap, and the connection bracket engages with the fluorescent tube by the snap.

* * * * *